No. 808,860. PATENTED JAN. 2, 1906.
F. J. MORRISON.
GRAB HOOK.
APPLICATION FILED APR. 29, 1905.
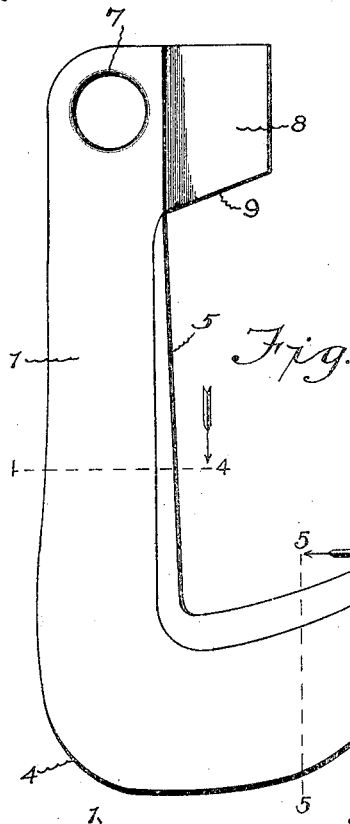
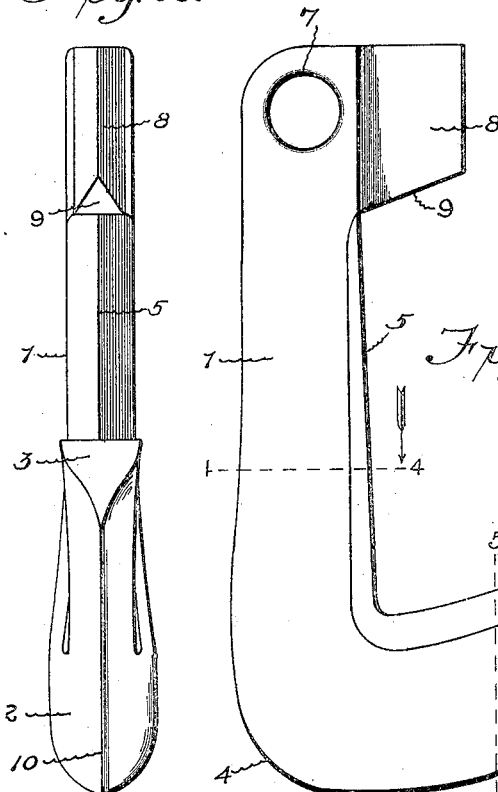
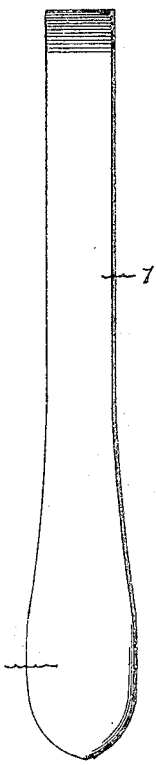
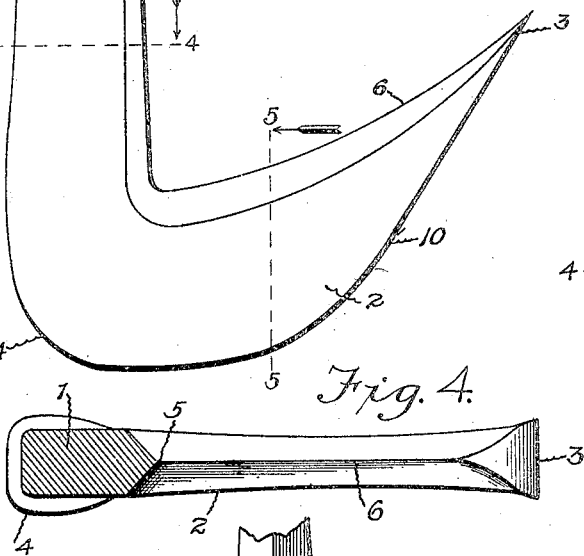
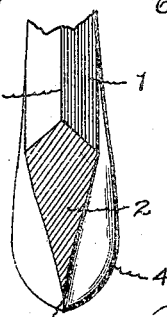
WITNESSES:
Ralph H. Shepard
H. J. Samyan
INVENTOR
Frederick J. Morrison
BY H. J. Shepard
Attorney

UNITED STATES PATENT OFFICE.

FREDERICK J. MORRISON, OF EMPORIUM, PENNSYLVANIA.

GRAB-HOOK.

No. 808,860. Specification of Letters Patent. Patented Jan. 2, 1906.

Application filed April 29, 1905. Serial No. 257,999.

*To all whom it may concern:*

Be it known that I, FREDERICK J. MORRISON, a citizen of the United States, residing at Emporium, in the county of Cameron and State of Pennsylvania, have invented new and useful Improvements in Grab-Hooks, of which the following is a specification.

This invention relates to grab-hooks for skidding logs and similar work, and has for its object to provide certain new and useful improvements in this class of devices to enable the convenient engagement of the hook with a log, to insure the effective retaining of the hook upon the log, to facilitate removing of the hook, and in general to enable a more convenient handling of the device.

The invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a grab-hook embodying the features of the present invention. Fig. 2 is a front elevation thereof. Fig. 3 is a rear elevation. Fig. 4 is a plan view in section on the line 4 4 of Fig. 1. Fig. 5 is a fragmentary sectional view on the line 5 5 of Fig. 1.

Like characters of reference designate corresponding parts in each and every figure of the drawings.

As illustrated in the accompanying drawings, the present grab-hook includes a straight shank 1, terminating at one end in a hook 2, the tip or point 3 of the bill of the hook being chisel-shaped and somewhat wider than the greater portion of the hook, while the heel portion 4, or the part where the shank and the hook merge into one another, is thickened or laterally enlarged to offer a broad surface upon which to strike a blow for driving the chisel-point of the hook into a log. As best indicated in Fig. 3 of the drawings, it will be noted that the back of the shank is substantially straight and flat, while its front is beveled to produce a cutting edge 5, which extends along the inner edge of the bill of the hook, as indicated at 6, with its outer end portion terminating at the point where the top of the bill is flattened out to form the chisel-point 3. In that extremity of the shank which is opposite the hook there is an opening 7, constituting an eye for the reception of a hook or link of a chain. The beveled edge 5 terminates short of the opening or eye 7, and a pointed or wedge-shaped wing or blade 8 fills out the remaining portion of the front edge of the shank with its outer end flush with the tip of the shank and its inner end 9 beveled or inclined downwardly or inwardly to the shank. Upon reference to Fig. 5 it will be noted that the bill of the hook is thickest across where the bevel 5 commences, from which it gradually tapers to a sharp edge 10 throughout its outer side, said edge terminating at one end in the heel 4 and at its opposite end at the point where the tip of the bill is flattened to produce the chisel-point 3.

In using the present device the chisel-point 3 is driven into a log by striking upon the heel 4 with a sledge or other suitable implement, and when strain is applied to the chain, which is hooked into the eye 7, the beveled inner edge 6 of the hook sinks into the log and the blade or projection 8 also engages and buries itself into the log, so as to prevent swinging of the hook and consequent loosening thereof when the log or logs are being dragged along over the ground or when being bound upon a sled, wagon, or the like. After the chisel-point of the bill has been driven into a log and the fiber thereof springs back into snug engagement with the thinner portion of the bill in rear of the point the latter is not liable to work out, while the sharp edge 3 of the bill biting into the log also tends to prevent slipping of the hook thereon.

From the foregoing description it will be understood that the grab-hook of the present invention is in a form to be conveniently handled for engaging the same with a log and being formed of a single piece is exceedingly strong and durable. Moreover, the heel of the hook is enlarged, so as to strengthen the same at the point where it is to be struck to drive the bill of the hook into a log. In removing the hook all that is necessary is to give a light tap with a pointed hammer or the like between the beveled edge 6 of the hook and the log, whereby the pointed portion of the hammer sinks into the log and pries the hook out of the log in a very simple and efficient manner without liability of breaking the hook.

Having thus described the invention, what is claimed is—

1. A grab-hook comprising a shank having an eye in one end and a bill at the opposite end, the outer end of the bill being formed into a chisel-point from which the bill decreases in width and then increases in width until it merges into the shank.

2. A grab-hook comprising a shank having an eye in one end and a bill at the other end thereof, the inner edge of the bill being beveled to form a longitudinal cutting edge.

3. A grab-hook comprising a shank having an eye at one end and a bill at the other end, the outer end of the bill terminating in a chisel-point from which the bill decreases in width and then increases in width until it merges into the shank, the inner edge of the bill being beveled to form a longitudinal cutting edge terminating at the point where the end of the bill is flattened to form the chisel-point.

4. A grab-hook comprising a shank having an eye at one end and a bill at the other end thereof, the inner edge of the bill and the front edge of the shank being beveled to form cutting edges extending one into the other.

5. A grab-hook comprising a shank provided at one end with an eye and a tapered blade projecting forwardly of the front edge of the shank in alinement with the eye, the opposite end of the shank being provided with a bill with the heel portion between the bill and the shank laterally enlarged, the outer end of the bill terminating in a chisel-point from which it decreases in width and then increases in width until it merges into the shank, the front edge of the shank and the inner edge of the bill being beveled to form longitudinal cutting edges extending one into the other and the bill being beveled outwardly to form an outer cutting edge, the inner and outer cutting edges of the bill terminating at the point where the extremity of the bill is flattened to form the chisel-point.

In testimony whereof I affix my signature in presence of two subscribing witnesses.

FREDERICK J. MORRISON.

Witnesses:
F. A. ROSENBLOOM,
BESSIE DEITZ.